(12) United States Patent
Hoeflacher et al.

(10) Patent No.: US 7,286,916 B2
(45) Date of Patent: Oct. 23, 2007

(54) METHOD FOR DETERMINING THE TIME AND EXTENT OF MAINTENANCE OPERATIONS

(75) Inventors: Robert Hoeflacher, Stuttgart (DE); Rainer Kaufmann, Stuttgart (DE); Walter Kostelezky, Ostfildern (DE); Kurt Lay, Rottenburg (DE); Rupert Reiger, Ottobrunn (DE)

(73) Assignee: DaimlerChrysler AG, Stuttgart (DE)

( * ) Notice: Subject to any disclaimer, the term of this patent is extended or adjusted under 35 U.S.C. 154(b) by 635 days.

(21) Appl. No.: 10/481,258

(22) PCT Filed: Jun. 13, 2002

(86) PCT No.: PCT/EP02/06479

§ 371 (c)(1),
(2), (4) Date: Mar. 12, 2004

(87) PCT Pub. No.: WO02/102627

PCT Pub. Date: Dec. 27, 2002

(65) Prior Publication Data

US 2005/0080525 A1  Apr. 14, 2005

(30) Foreign Application Priority Data

Jun. 19, 2001  (DE) ................................ 101 29 457

(51) Int. Cl.
*G01M 17/00*  (2006.01)
(52) U.S. Cl. ................... 701/29; 701/30; 340/457.4
(58) Field of Classification Search .................. 701/29, 701/30; 340/457.4
See application file for complete search history.

(56) References Cited

U.S. PATENT DOCUMENTS 4,525,782 A * 6/1985 Wohlfarth et al. ............ 701/99
4,884,054 A 11/1989 Moon

FOREIGN PATENT DOCUMENTS

| DE | 3110774 | 10/1982 |
|----|---------|---------|
| DE | 3234727 | 3/1984 |
| DE | 19812318 | 9/1999 |
| EP | 0661673 | 7/1995 |
| GB | 2127554 | 4/1984 |
| GB | 2127554 A * | 4/1984 |

* cited by examiner

*Primary Examiner*—Thomas Black
*Assistant Examiner*—Marie A Weiskopf
(74) *Attorney, Agent, or Firm*—Crowell & Moring LLP (57) ABSTRACT

In a method for defining the time and scope of maintenance operations for a system having a plurality of maintenance items, each of which should be carried out within an assigned tolerance range, a minimum maintenance interval between successive maintenance operations is predefined. The timing of a maintenance operation is predictively fixed at at least that tolerance range end point which is the first of the tolerance range end points of maintenance items relating to maintenance times to follow the time of a preceding maintenance operation while complying with the minimum maintenance interval. At least those maintenance operations whose tolerance range end points occur before the predicted subsequent maintenance time are defined as the scope of the imminent maintenance operation.

3 Claims, 12 Drawing Sheets

METHOD FOR DETERMINING THE TIME AND EXTENT OF MAINTENANCE OPERATIONS

BACKGROUND AND SUMMARY OF THE INVENTION

This application claims the priority of German patent document 101 29 457.3, filed 19 Jun. 2001 (PCT International Application No.: PCT/EP02/06479), the disclosure of which is expressly incorporated by reference herein.

The invention relates to a method for defining the time and scope of maintenance operations for a system having a plurality of maintenance items, each of which should be carried out within an associated flexible maintenance interval and tolerance range, with a predetermined minimum maintenance interval between successive maintenance operations.

Such methods are customary, for example, for the maintenance of motor vehicles. In this application, fixed maintenance intervals in the form of corresponding time intervals or mileage intervals are conventionally predefined. In addition, there is usually a fixed predefinition of which maintenance items are to be carried out during a respective maintenance operation. With this type of predefined maintenance of motor vehicles, the respective vehicle component is maintained at fixed intervals independently of the severity of its actual wear, which may vary appreciably from vehicle to vehicle, for example due to different driving styles.

German patent document DE 31 10 774 A1 discloses a method for defining maintenance times for motor vehicles in which a reference variable (for example, the state of the brake linings or the state of the engine oil), is fixed as decisive. An associated maintenance value of the reference variable is predefined and the actual value of the reference variable is sensed continuously while the vehicle is actually operating, and compared with the maintenance value. As soon as the actual value reaches the maintenance value, an indication is given that a maintenance operation should be carried out.

For further operating variables which are to be maintained as a function of wear, such as clutch, carburetor setting, spark plugs, ignition times and battery voltage, their actual values are also sensed from time to time and compared with stored wear limiting values. Depending on the wear state, the respective operating variable is assigned to a maintenance operation which is determined by the reference variable, within a tolerance range which is formed as a function of the mileage, fuel consumption, time or a combination of these variables. Here, the maintenance time is defined within the tolerance range in the direction of the upper or lower range limit by reference to an evaluation of the reference variable and the respective operating variable. In addition, assuming that loading of the vehicle remains the same, the wear limit can be extrapolated from a computing unit which carries out the method. A load diagram can be created for the operating variable values which are decisive for the loading of the vehicle, from which diagram it is possible to detect whether the vehicle is being operated mainly in the partial load mode or full load mode.

German patent document DE 32 34 727 A1 discloses a method for defining maintenance times for a motor vehicle in which the current wear of components that are to be maintained and the duration of operation or of the vehicle, the engine speed and the temperature of the cooling water are measured and the current wear is compared with a predefinable wear limiting value, in order to calculate the expected service life of the respective component therefrom. The shortest time period or distance in which a plurality of monitored components are subject to wear within a predefinable maximum tolerance range is then indicated, or the distance for a component which is worn by more than the predefined tolerance range before the other components is indicated.

One object of the invention is to provide a method of the type described above, with which the time and scope of maintenance operations can be defined for a system having a plurality of maintenance items in a comparatively reliable, flexible and cost-effective way.

This and other objects and advantages are achieved by the method according to the invention, in which, on the one hand, a minimum maintenance interval for a next maintenance operation (i.e., subsequent maintenance operation) and, on the other hand, flexible maintenance intervals and tolerance ranges for the maintenance items are predefined. The maintenance interval variable and the maintenance intervals and tolerance ranges for the maintenance items can be predefined differently. For the sake of optimization, it is possible to iterate over this variable maintenance interval.

Furthermore, at least some of the maintenance items are treated as serving to define maintenance times, and are referred to below as control function maintenance items. The latter are taken into account in defining the maintenance times. Specifically, for a particular maintenance operation which is to follow a preceding maintenance operation by at least a minimum maintenance interval, the time is predictively fixed at least at the earliest tolerance range end point (among the control function maintenance items) which complies with the minimum maintenance interval. All maintenance items whose tolerance end points occur before this predicted, aimed-at subsequent maintenance time are included in the extent of the preceding maintenance operation.

This procedure permits components which are subject to wear to be maintained sufficiently promptly, and thus reliably, in a very flexible way, by means of fixed or variable predefinition of the minimum maintenance interval and of the maintenance intervals and tolerance ranges which can be selected individually for each maintenance item. The maintenance intervals and tolerance ranges can be selected in a variable fashion as a function of the current conditions (in particular the current measured or predicted wear of the system component or components affected by a particular maintenance item), which permits a further improved adaptation of the subsequent maintenance operations to the current wear state of the various system components. In motor vehicles, different degrees of wear depending on the driving style can thus be taken into account in arriving at favorable maintenance times.

The method according to the invention thus ensures, on the one hand, that each maintenance item is carried out sufficiently frequently so that worn system components are maintained promptly, and, on the other hand, selecting a correspondingly long minimum maintenance interval avoids premature performance of maintenance operations.

In one embodiment of the invention, the maintenance items are categorized into one or more respective maintenance secondary items. When the sequence of a maintenance operation is created, the maintenance secondary items of the maintenance items which are to be processed in the maintenance operation are tested with respect to the possibility of combining them. This permits an effective maintenance sequence in which the maintenance secondary items are combined for processing in such a way that, as far as possible, each maintenance secondary item has to be carried out only once.

In another advantageous embodiment of the invention, an optimization algorithm is used in which the complexity of the maintenance serves as a so-called cost function which is to be optimized. The complexity of the maintenance may be enumerated here, for example, as a specific amount of money or a cost value.

It is possible to use maintenance positions (that is, the timing of maintenance items) with a control function which are extracted from the optimization algorithm in order to determine the maintenance time, while others are then merely added to the maintenance packages. It is possible to take into account fixed regulatory deadlines such as for TÜV[German standards testing authority], ASU[German exhaust gas test] and nonscheduled visits to the workshop. The optimization process also includes provisions for moving subsequent maintenance positions forward on a test basis (i.e., maintenance positions, which according to the normal criteria would not be due until a subsequent maintenance time), to a preceding maintenance operation. In this case, the predefined minimum maintenance interval functions as a secondary condition of the optimization process. This measure can be used to determine whether the performance of one or more maintenance items will lead to a lower overall degree of complexity and is therefore to be recommended.

In practice, the wear of components which are to be maintained may be subject to time intervals or distance intervals and be calculated from load collectives or sensor data. On a program-internal basis, calculations are preferably carried out only with one unit (time or distance) and the result can then be presented again in both units. The possibility of incorporating various models for determining wear for this purpose ensures that a framework algorithm is provided. This permits, inter alia, wear models of suppliers to be incorporated and tested. For reasons of practicability, the system preferably permits manual correction of the optimum solution, for example in order to achieve further, less than optimum, solutions with associated maintenance deadlines, extent and cost of maintenance, as well as subsequent maintenance deadlines and costs. The user can thus predefine the time period between two maintenance deadlines in a reasonable range and control weighting which is optimized to a greater extent in terms of cost or time.

Other objects, advantages and novel features of the present invention will become apparent from the following detailed description of the invention when considered in conjunction with the accompanying drawings.

BRIEF DESCRIPTION OF THE DRAWINGS

FIG. 12 shows a graphic operator control interface and display interface for manually predefining a minimum maintenance interval and displaying results of the optimization operation and the formation of maintenance packages.

DETAILED DESCRIPTION OF THE DRAWINGS

Figure 1:
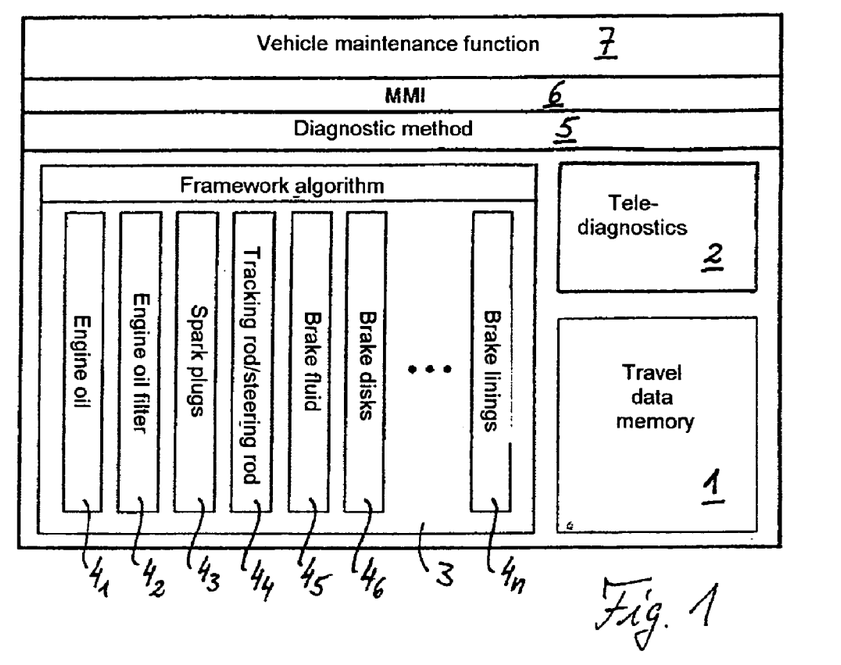
FIG. 1 is a block diagram of a basic implementation of an embodiment of the method according to the invention for optimized determination of the time and scope of maintenance operations for a motor vehicle.

FIG. 1 shows an example of the implementation of an advantageous method example which is suitable for the optimized definition of the time and extent of maintenance operations for motor vehicles in the scope of a vehicle maintenance function 7. As is apparent from FIG. 1, for this purpose, a diagnostic algorithm 5 for the entire vehicle is able to access three modules, including specifically a travel data memory 1, results of a telediagnosis 2, which are supplied to the system carrying out the method, and a framework algorithm 3 which has models $4_1, \ldots, 4_n$ (n>1) for predictively diagnosing the wear of a multiplicity n of vehicle components such as engine oil, engine oil filter, spark plugs, tracking rod/longitudinal rod, brake fluid, brake disks and brake linings, which are to be maintained. The various maintenance item models $4_1, \ldots, 4_n$ may be implemented in a conventional way (which therefore need not be explained further here), by corresponding sensors, relatively simple algorithms or relatively complex wear-determining algorithms (for example ones which operate on the basis of load collectives and which each apply their measured or calculated results to the framework algorithm 3). The diagnostic method level 5 is connected via a customary man/machine interface (MMI) 6 to the vehicle maintenance function 7 in order to permit user inputs and display the obtained results to the user.

Figure 2:
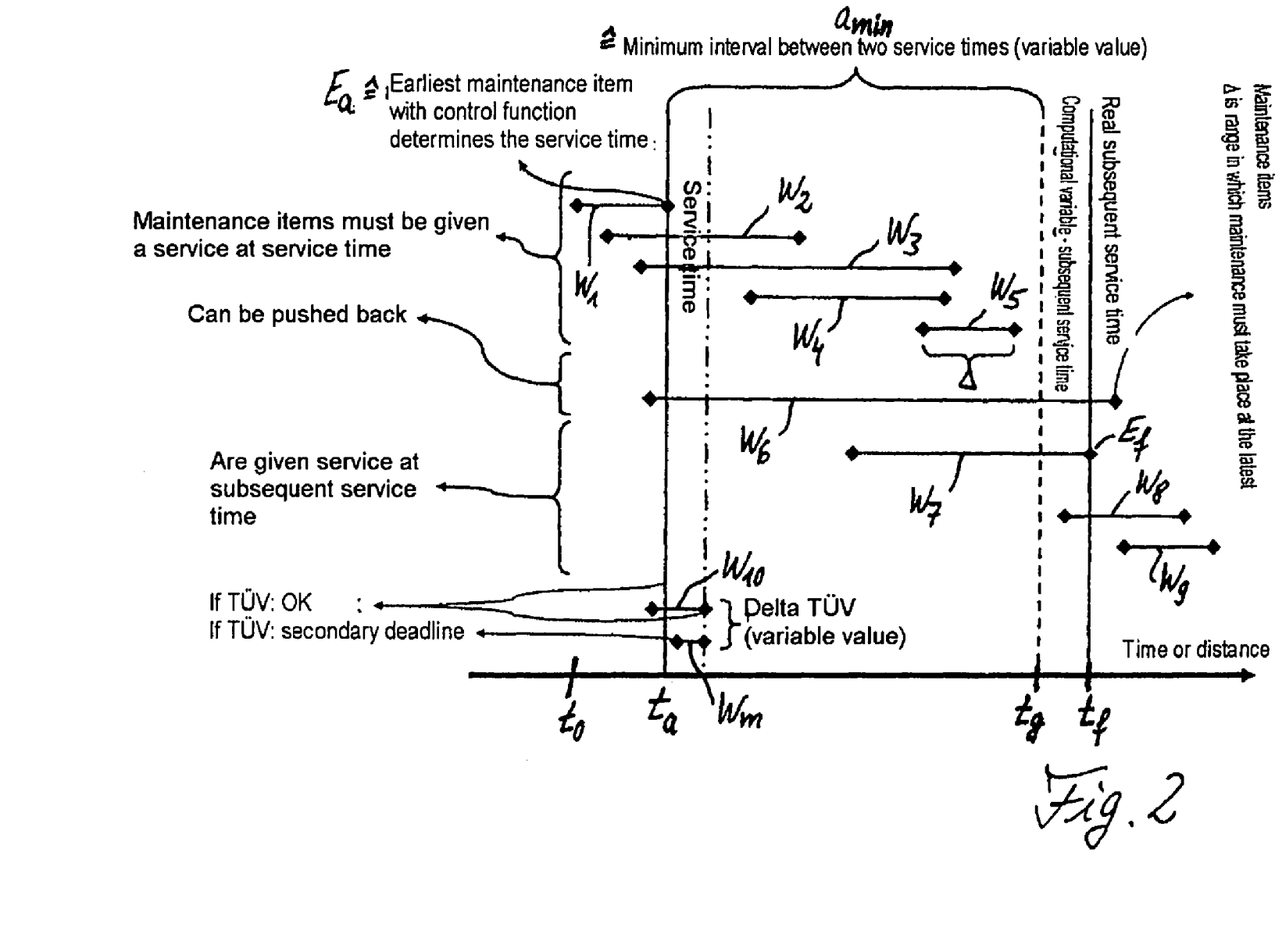
FIG. 2 is a schematic time or distance line illustration with various maintenance positions illustrating the definition, according to the method, of the times for an imminent maintenance operation and a subsequent maintenance operation and of the scope of the imminent maintenance.

FIG. 2 is a time or distance line which illustrates the basic principle, according to the invention, of the definition of the time and scope of the successive maintenance operations. As is customary in motor vehicles, there are a multiplicity m of maintenance items $W_1, \ldots, W_m$ (m>1) for maintaining the vehicle-mounted components which are subject to wear. Each of these is assigned a maintenance interval with an individually definable tolerance range $\Delta$ (shown in FIG. 2, for example, with respect to maintenance item $W_5$), within which interval the respective maintenance item should be carried out. At least some of the maintenance items $W_1, \ldots, W_m$ are selected as a respective control function maintenance item which have a control function for the definition of the maintenance times, i.e. are considered as relevant. The respective tolerance range $\Delta$ may be the smallest common interval.

Starting from a current time $t_0$, that tolerance range end point $E_a$ which occurs first among all the tolerance range end points of control function maintenance items following to is then used as the time $t_a$ for a next imminent maintenance operation. Furthermore, a minimum maintenance interval $a_{min}$ between each two successive maintenance operations is preferably predefined in a variable fashion by the system or by the user. The time $t_g$ which occurs at expiration of this minimum maintenance interval $a_{min}$ following the time $t_a$ for the imminent maintenance operation then forms the earliest possible time for a next maintenance operation (i.e., a subsequent maintenance operation). The latter is preferably also displaced as far as possible in the late direction starting from this time $t_g$ in order to reduce expenditure on maintenance. That tolerance range end point $E_f$ which, of all the tolerance range end points of the control function maintenance items, is the first following the earliest possible subsequent maintenance time $t_g$, or corresponds to it, is then defined as the latest possible subsequent maintenance time $t_f$. This latest possible subsequent maintenance time $t_f$ is defined as a predicted, desirable time of the subsequent maintenance operation.

The execution of at least those maintenance items whose tolerance range end points occur before the scheduled subsequent maintenance time $t_f$ (in the example in FIG. 2, these the maintenance items $W_1$ to $W_5$), is then defined as the extent of the imminent maintenance operation. Maintenance items whose tolerance range end point is at or after the scheduled subsequent maintenance time $t_f$ can be included in the scope of the next subsequent maintenance operation, or of a later one. (In the example in FIG. 2, these are the maintenance items $W_6$ to $W_9$). The latter also applies to maintenance items whose tolerance range comprises the entire range between the imminent maintenance time $t_a$ and the scheduled maintenance time $t_f$, as in the case of the maintenance item $W_6$ in FIG. 2.

A special treatment can be provided for specific special maintenance items which are determined, for example, by legal requirements such as those of standards testing authorities and exhaust gas monitoring. If such a special maintenance item is the one which determines a maintenance time in accordance with the rules explained above, other maintenance items are normally delayed to the corresponding time of the special maintenance item (i.e., at the latest to the time of the tolerance range end point of the special maintenance item if one exists for the special maintenance item). If the maintenance item which determines the normal maintenance time is not a special maintenance item, it is checked whether the latter is located among the maintenance items which have been brought forward to the next maintenance operation. In this case, the special maintenance item is provided with a separate treatment. The regulatory tolerance range in which an examination is intended to take place is generally small as it is generally not desired for the user to move it forward owing to the associated expenditure. Therefore, if the tolerance range of the respective special maintenance item does not overlap with the maintenance time which is determined as explained above, the method assigns, as a special treatment, its own, separate maintenance deadline to the special maintenance item, as far as possible at the end of its tolerance range, as indicated in FIG. 2 by the dot-dash line.

Figure 3:
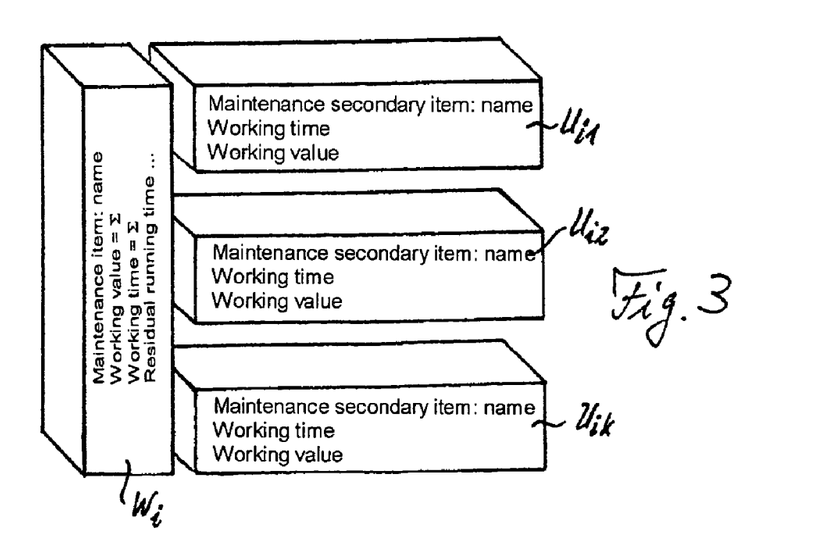
FIG. 3 is a block diagram of a more precise structure of the maintenance items.

FIG. 3 illustrates the typical, presently used maintenance item structure. Each maintenance item $W_i$ is composed of one or more maintenance secondary items $U_{i1}, U_{i2}, \ldots, U_{ik}$ which each represent a specific maintenance working step. For example, a maintenance item "Change brake lining" can thus be composed of the three maintenance secondary items "Open brake", "Change brake linings" and "Close brake".

The maintenance secondary items $U_{i1}, \ldots, U_{ik}$, and thus also the respective maintenance item $W_i$ are assigned maintenance-related parameters such as the working time which is required for implementation and the working value which is associated with it (i.e., the costs incurred). A residual running time parameter indicates how long it is expected to remain possible to wait for the execution of the maintenance item $W_i$.

Figure 4:
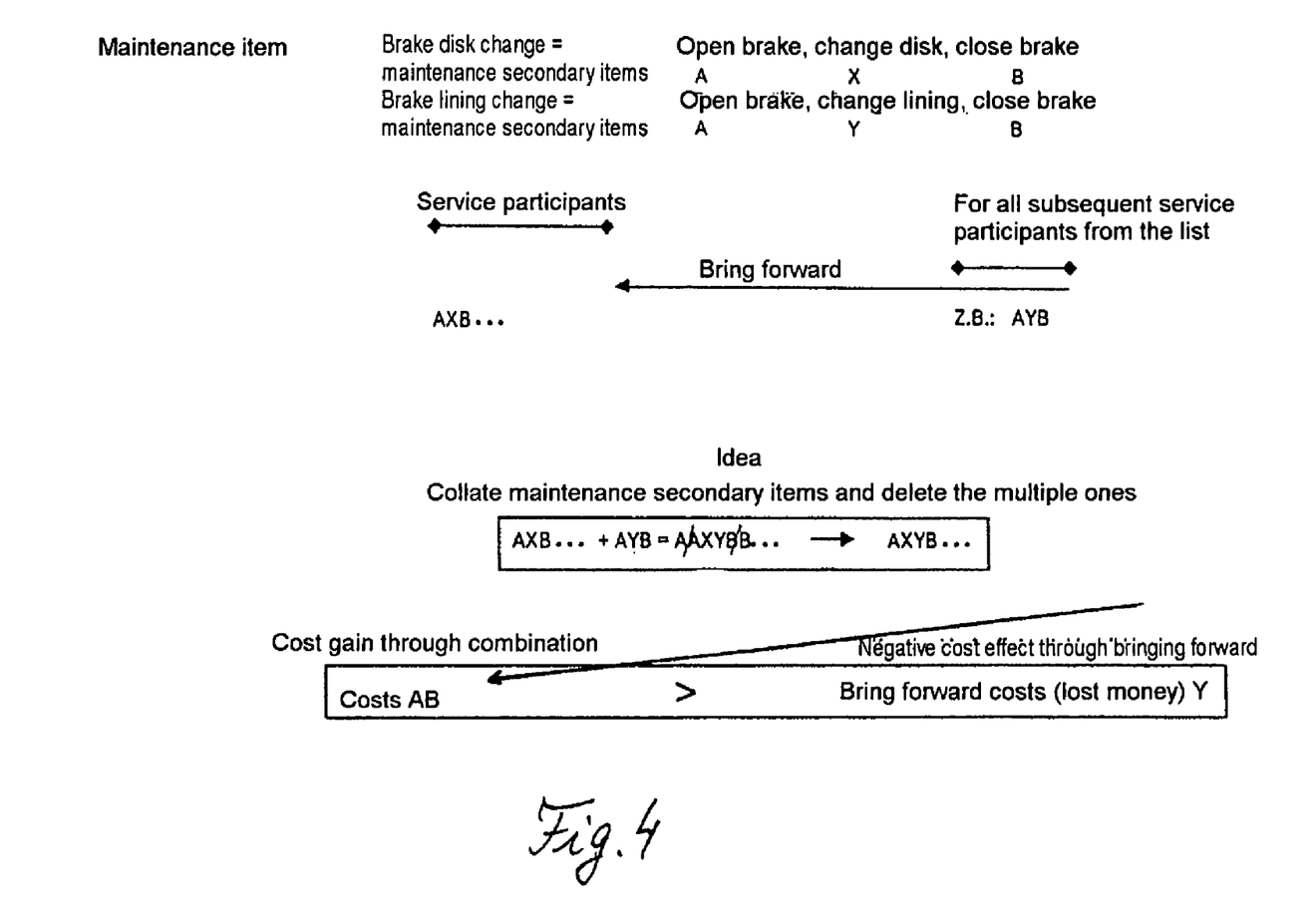
FIG. 4 illustrates testing for the possibility of combining maintenance secondary items of two maintenance items which are taken by way of example, on the basis of the maintenance item structure in FIG. 3.

In the method according to the invention, this maintenance item structure is used to examine, during the definition of the extent and sequence of a respective maintenance operation, the maintenance items which are involved and are to be carried out, to determine whether, and to what extent, they contain common maintenance secondary items and can thus be combined in such a way that a maintenance secondary item which occurs in a plurality of maintenance items needs to be carried out as far as possible only once. FIG. 4 illustrates this measure using the example of a first maintenance item "Change braking lining" which is composed of the maintenance secondary items "Open brake" (A), "Change brake linings" (X) and "Close brake" (B), and of a second maintenance item "Change brake disk" which is composed of the maintenance secondary items "Open brake", "Change brake disk" (Y) and "Close brake". At the same time, this example is used to illustrate the case in which the brake lining with its working sequence AYB of the maintenance secondary items would in fact not have to be changed until during a subsequent maintenance operation, but is brought forward on a test basis to an imminent maintenance operation within an optimization operation (explained in more detail below). This maintenance operation includes the changing of the brake disk with its sequence AXB of the maintenance secondary items. Here, the term "Service" in FIG. 4 stands as a synonym for the term "Maintenance operation".

According to the invention, in testing the possibility of combining the maintenance secondary packages AXB, AYB, . . . of the maintenance items which are to be carried out in the respective maintenance operation, are combined as far as possible, combinatorially, after which multiple denominations of identical maintenance secondary items are deleted. That is, the working sequence AXB+AYB which is not combined can be simplified to form the combined sequence AXYB. The cost gain in terms of optimization which can be achieved by eliminating multiple executions of maintenance secondary items may, depending on the situation, exceed the negative cost effect which is associated with moving maintenance items forward, so that moving them forward in such a way may have an overall advantage in certain cases.

The cost function which is used for the optimization process may be, in particular, a specific amount of money or invoice amount which is linked to the respective maintenance working step. The negative cost effect as a result of moving forward results from the failure to use the estimated residual running time of the maintenance item, for example measured from 100% to 0% related to the maintenance item costs which are predefined for this at the maintenance secondary item level, as explained with respect to FIG. 3 above. The overall maintenance costs for a maintenance operation are then simply determined as the sum of the costs of all the maintenance secondary items to be carried out, and form the cost function to be minimized in the optimization process.

Figure 5:
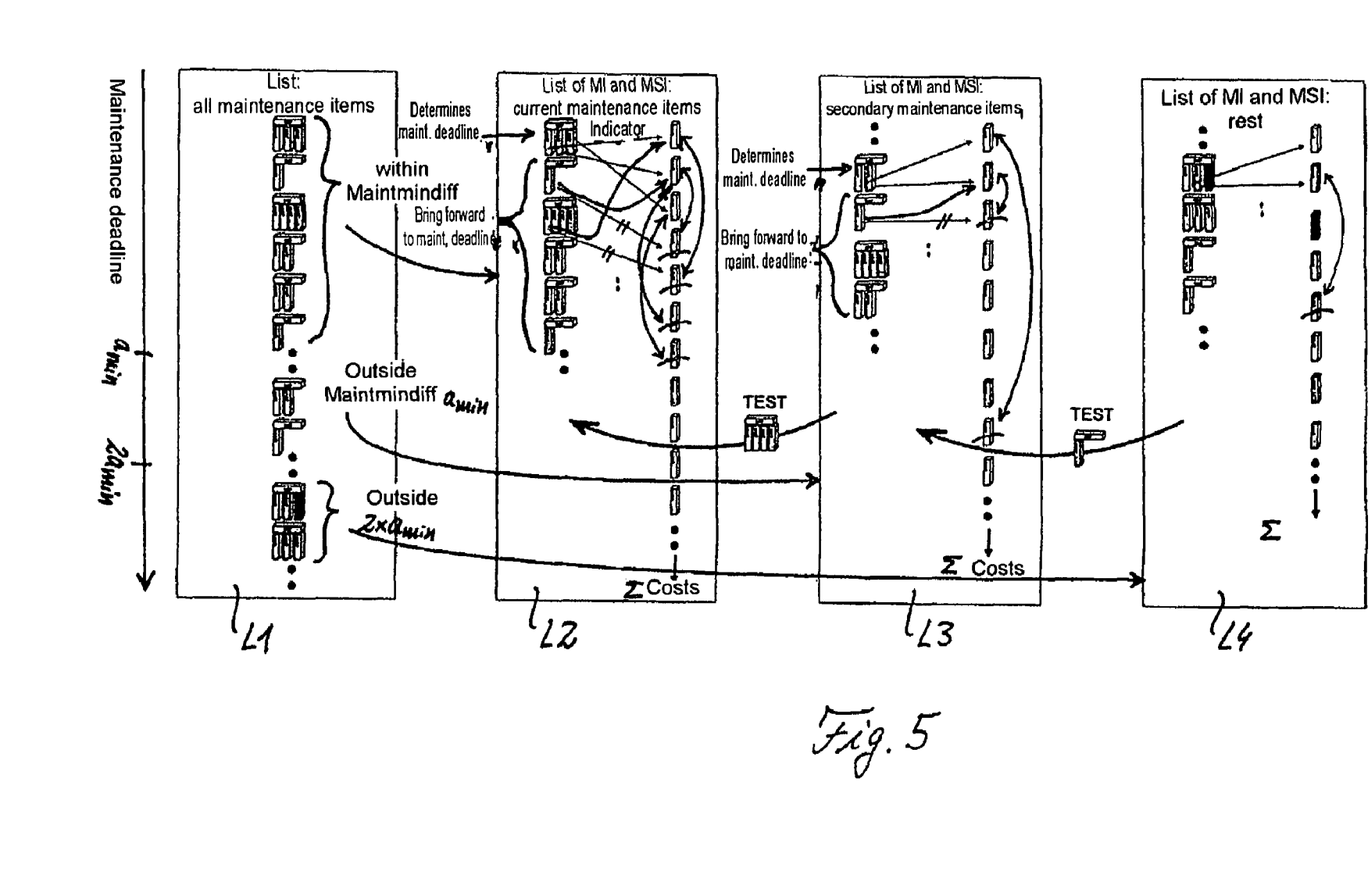
FIG. 5 is a schematic illustration of an optimization operation for defining the extent of a respective maintenance operation with maintenance items being brought forward on a test basis.

FIG. 5 illustrates the optimization process which is used. The starting point here is first a complete list L1 of all maintenance items, a list L2 of all maintenance items which are to be carried out in a current, imminent maintenance operation, and their maintenance secondary items, and lists L3, L4 of the maintenance items which are to be carried out in subsequent maintenance operations, and their maintenance secondary items. The initial lists L2 to L4 for the current maintenance operation and the subsequent maintenance operations are created in accordance with the procedure explained above with respect to FIG. 2.

Figure 6:
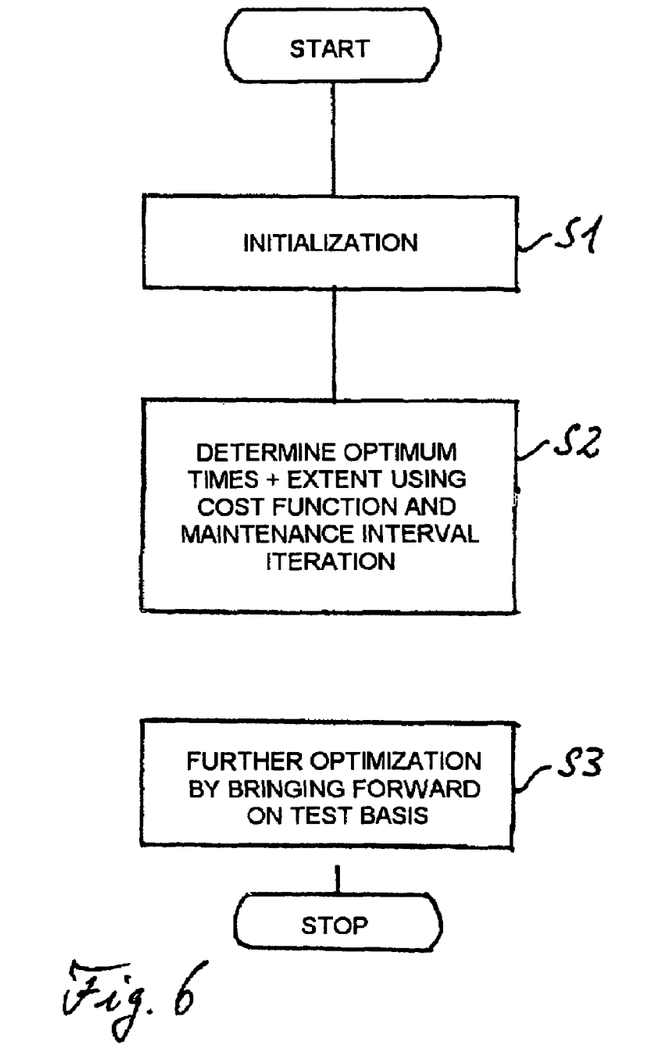
FIG. 6 is a schematic flow chart of an embodiment of the method according to the invention.

FIG. 6 is a schematic flow chart of the method according to the invention. The required initial variables are defined in an initial initialization phase S1. This comprises initializing the maintenance item list.

Furthermore, the next maintenance time is defined with reference to the control function maintenance item which is due at the earliest, and an initial assignment of the maintenance items to the imminent maintenance operation and to subsequent maintenance operations is carried out in accordance with a first optimization process (step S2).

During this optimization, iteration is carried out over the minimum maintenance interval $a_{min}$ (for example in monthly steps). FIG. 5 shows the state for an iteration step (i.e., for a specific minimal maintenance interval value $a_{min}$). Which maintenance items occur in which regions is determined here, the list of the working steps is formed and the multiply-occurring steps deleted. The costs and the cost saving due to deletion, advancement of the maintenance items to the respective deadline and the losses due to failure to exploit residual operation time, are calculated.

Then, there is an additional test to determine whether gains due to the advancement of maintenance items to earlier deadlines bring savings. (See step S3 in FIG. 6.) Given work-intensive maintenance items, it is also possible to achieve further gains here, preferably when there is a relatively small minimum maintenance interval $a_{min}$.

The elements of a list are tested for "possibility of advancement" until there is no more gain at any maintenance item when passing through the list. If a maintenance item can be moved forward, once the list has ended it is started again from the beginning as the items which have already been tested could then possibly be combined satisfactorily with this new maintenance item after the moving-forward operation.

The actual costs for a fixed maintenance interval $a_{min}$ result from the sum of the working step costs (FIG. 5), plus the standing costs, the latter being made up of a fixed cost element and a time-dependent element. The duration of a maintenance deadline is calculated from the sum of the durations of the working steps, see FIG. 5.

The sum of the cost saving from combining maintenance items, on the one hand, and standing costs plus wasted money by advancing maintenance items, on the other, is the variable which determines the optimum in terms of the peripheral condition of a predefined minimum interval between two maintenance deadlines.

If iteration is carried out over the minimum maintenance interval $a_{min}$ (for example in monthly steps) and if the above variable is plotted "per time unit" against the minimum maintenance interval $a_{min}$, the minimum of this map or this cost function thus supplies the optimum maintenance scope and, using $a_{min}$, the optimum deadline and scope of a subsequent maintenance. The variable "per time unit" takes into account, for example, the case in which one expensive maintenance procedure per year may be more favorable than two somewhat cheaper maintenance operations. The above variable which determines the optimum is thus to be taken correctly per time unit (i.e., to be divided by $a_{min}$).

The position of the extreme values, here the minimum values, is essential for a cost function. If the constant value of the sum of: "costs of each maintenance item divided by the respective current maintenance interval of this maintenance item" (that is to say the sum of "costs per maintenance item/time") is added to the above cost function, the position of the absolute minimum of the cost function remains unchanged and the same optimum result is thus obtained. However, the function value of the cost function also supplies the actual costs of the maintenance for the respective result $a_{min}$ including corrections for combination and losses due to moving forward and down times, per time unit.

A maintenance interval of a maintenance item is to be considered here as constant only at the current time as it may be the result of load collectives or a sensor system and thus be flexible and may in turn thus change, for example as a result of changes in the driving behavior. This is the basis of the person-specific or driving-behavior-specific maintenance.

The curve may have not only the absolute minimum but further relative minimums (less than optimum solutions of the problem) or further points of interest. This requires the possibility of manually inputting $a_{min}$ including the representation of the extent of maintenance, maintenance costs, working steps, etc., see FIG. 12.

Figure 7:
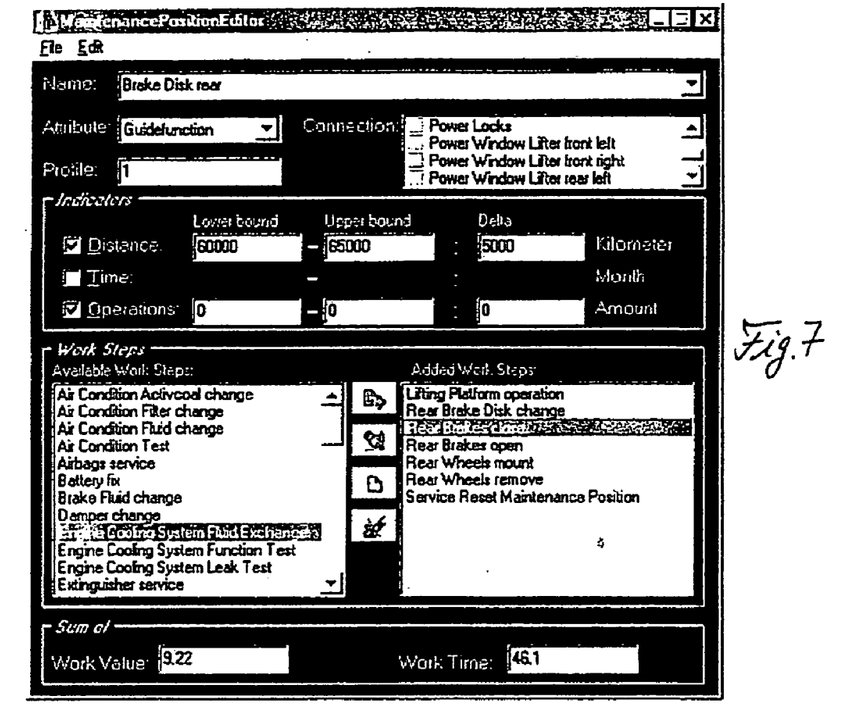
FIG. 7 shows a graphic operator control interface of a working item editor of the method.

FIGS. 7 to 14 illustrate implementation of the method using graphic screen interfaces. FIG. 7 shows a maintenance item editor in which, for example, the maintenance item "Rear disk brakes" in the menu item "Name" is called. At this menu item, the complete list of all the created maintenance items is stored. Maintenance items can be edited or newly created using the maintenance item editor. Working steps listed in the left-hand lower window may be assigned to each maintenance item. The right-hand lower window shows the working steps assigned to the respective maintenance item. Furthermore, each maintenance item contains an attribute "Control function", "Additional maintenance item" or "Only monitoring", as well as the possibility of inputting the maintenance interval and tolerance range of the maintenance item in units of mileage, time or the number of operations. The respective maintenance interval has an adjustable width "Delta" within which the maintenance has to be carried out in the case of maintenance items with a control function (tolerance range). One option "Connection" makes it possible to define whether a maintenance item (for example brake disks), always requires another maintenance item to be carried out with it (for example brake linings). This reference may be defined on one side; that is, the reversal must then also be specified explicitly as it is not always applicable.

Figure 8:
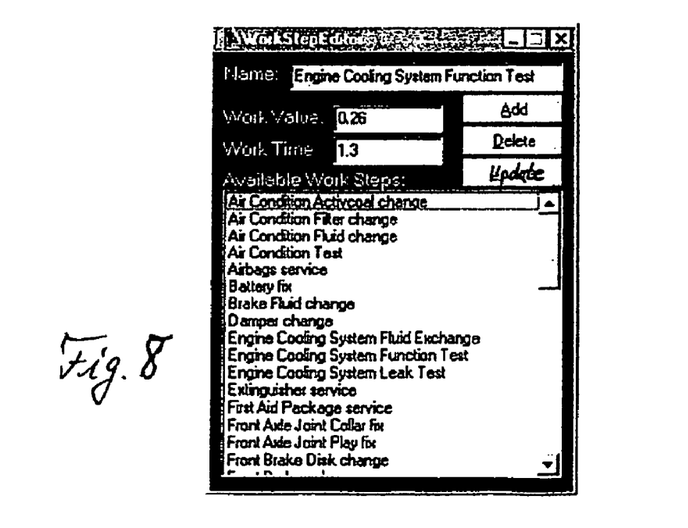
FIG. 8 shows a graphic operator control interface of a working step editor of the method.

FIG. 8 shows an associated maintenance secondary item editor or working step editor. It can be used to edit and create maintenance secondary items. Each maintenance secondary item contains the parameters "Working value" (i.e., costs) and "Working time".

Figure 9:
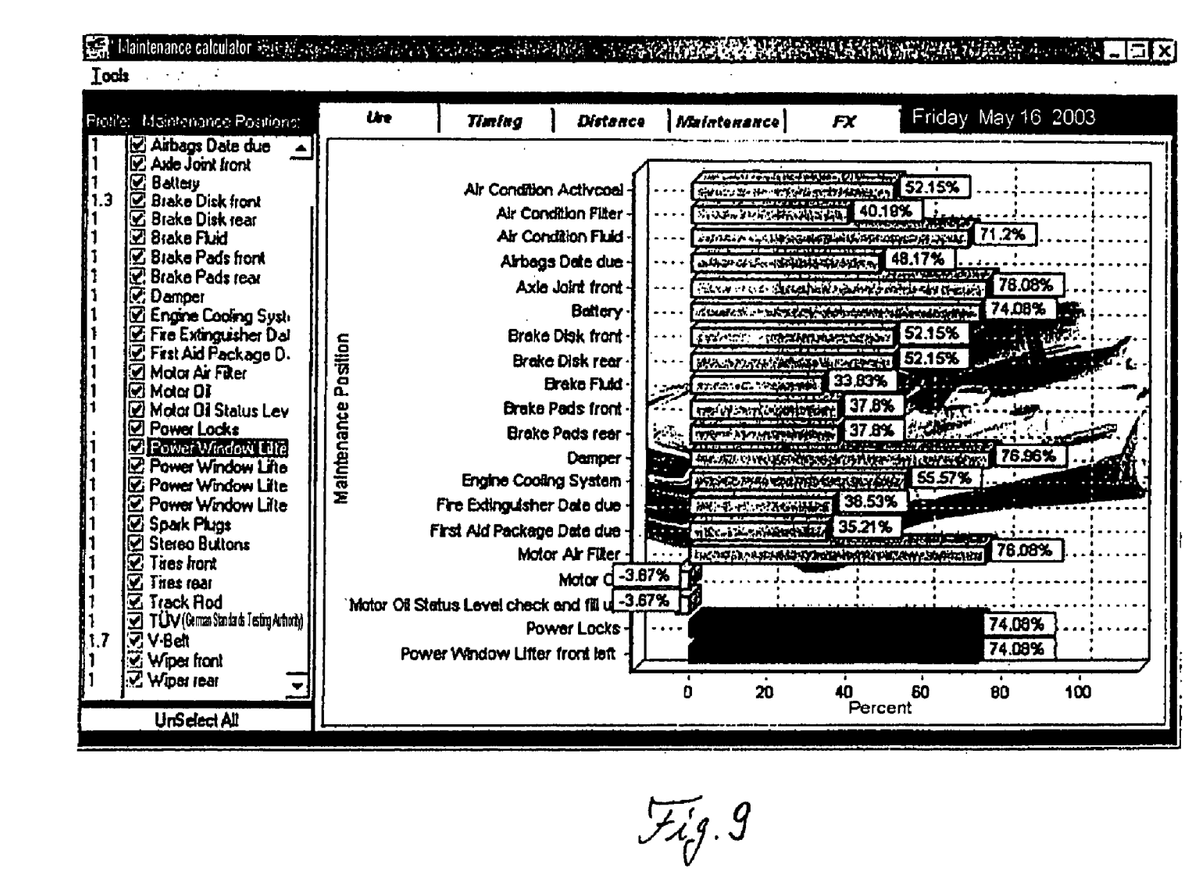
FIGS. 9 to 11 show a percentage, time-related or mileage-related graphic display of the state of maintenance items.

FIG. 9 shows, in an instantaneous recording, the current degree of wear of each selected maintenance item. If maintenance items are not yet sensed by load collectives or a sensor system, there is provision to sense speeded-up or slowed-down wear by means of a factor of a typifying or classifying driver profile or driving style profile. Conversely, the latter may be determined from the sensed or calculated wear.

Figure 10:
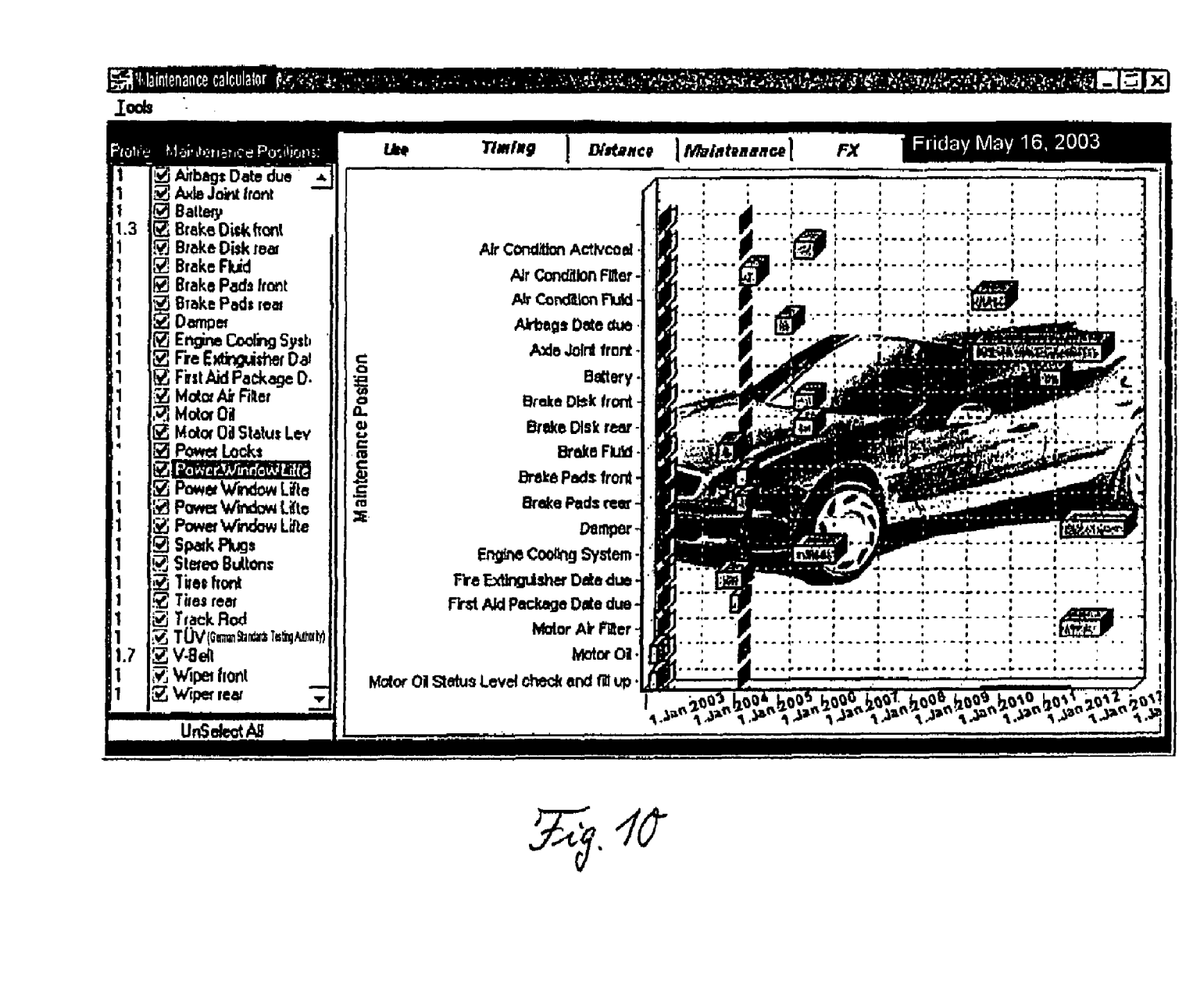

FIG. 10 shows a screen representation of the current degree of wear of all the selected maintenance items on a time axis using the individual degrees of wear and maintenance intervals and tolerance ranges of the maintenance items.

Figure 11:
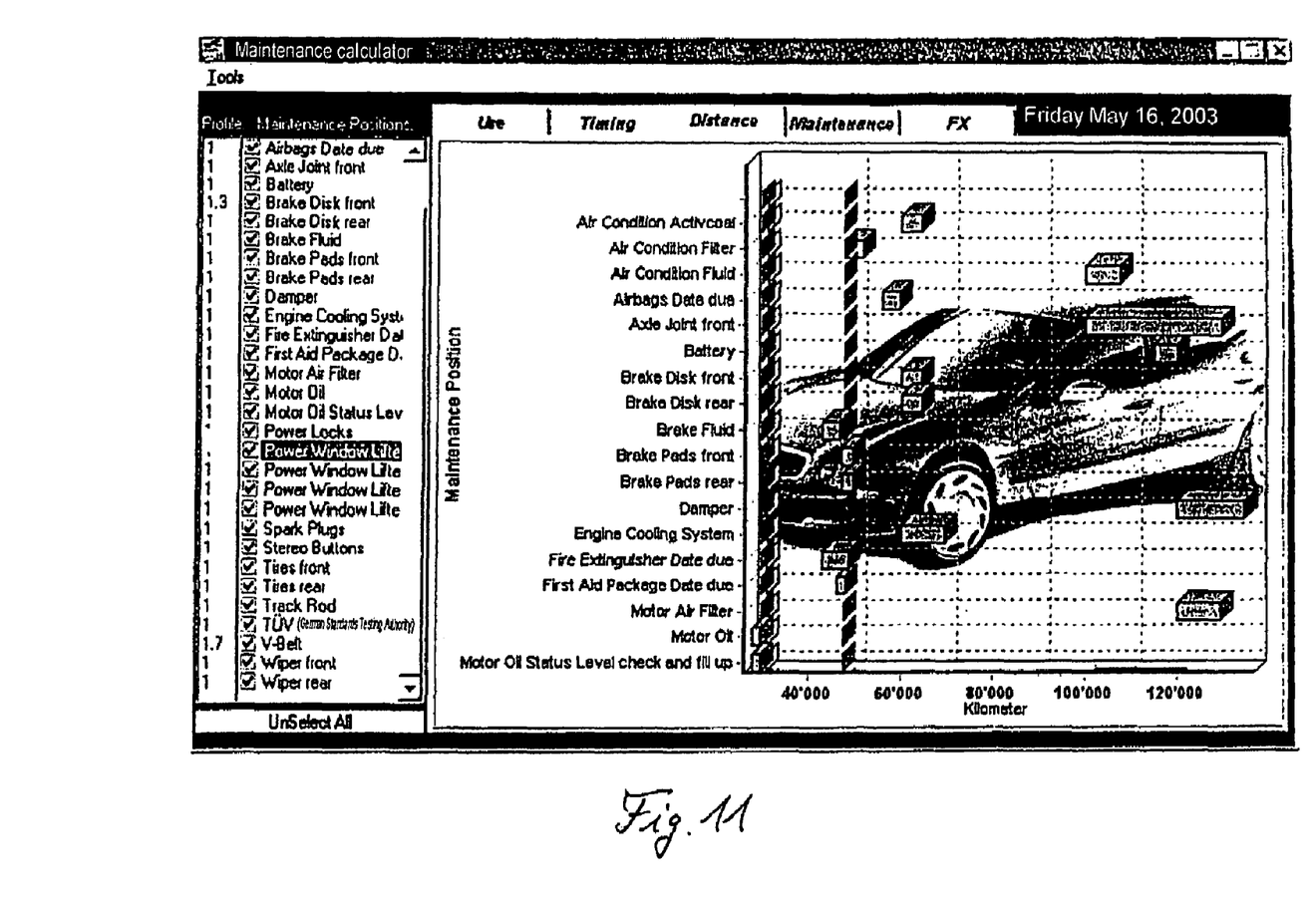

FIG. 11 shows a screen representation in which the current degree of wear of all the selected maintenance items is converted to the mileage or the distance traveled using the averaged number of miles traveled per time.

FIG. 12 shows the optimum maintenance package for a predefined time distance between two maintenance times, with the associated maintenance items, the working steps and the working steps which are saved through combination. By variably predefining the time distance (i.e., the minimum maintenance interval in units of time), it is possible to choose, as it were in an infinitely variable fashion, between more cost-optimized variants (short time distances) or more time-optimized variants (long time distances), and the calculated optimum value of $a_{min}$ can also be set according to FIGS. 13 and 14. Here, cost gains due to combination and negative cost effects due to advancement of maintenance items in order to form maintenance packages as well as fixed standing costs and standing costs per time are taken into account. The calculation amount, the costs of the optimum solution for a given minimum maintenance interval per month and for the purposes of comparison, the costs when carrying out each maintenance operation when the respective maintenance item is due per month are displayed. The latter are hypothetical as, in practice, it is not always possible to look for a service garage immediately when a maintenance item is due.

Figure 13:
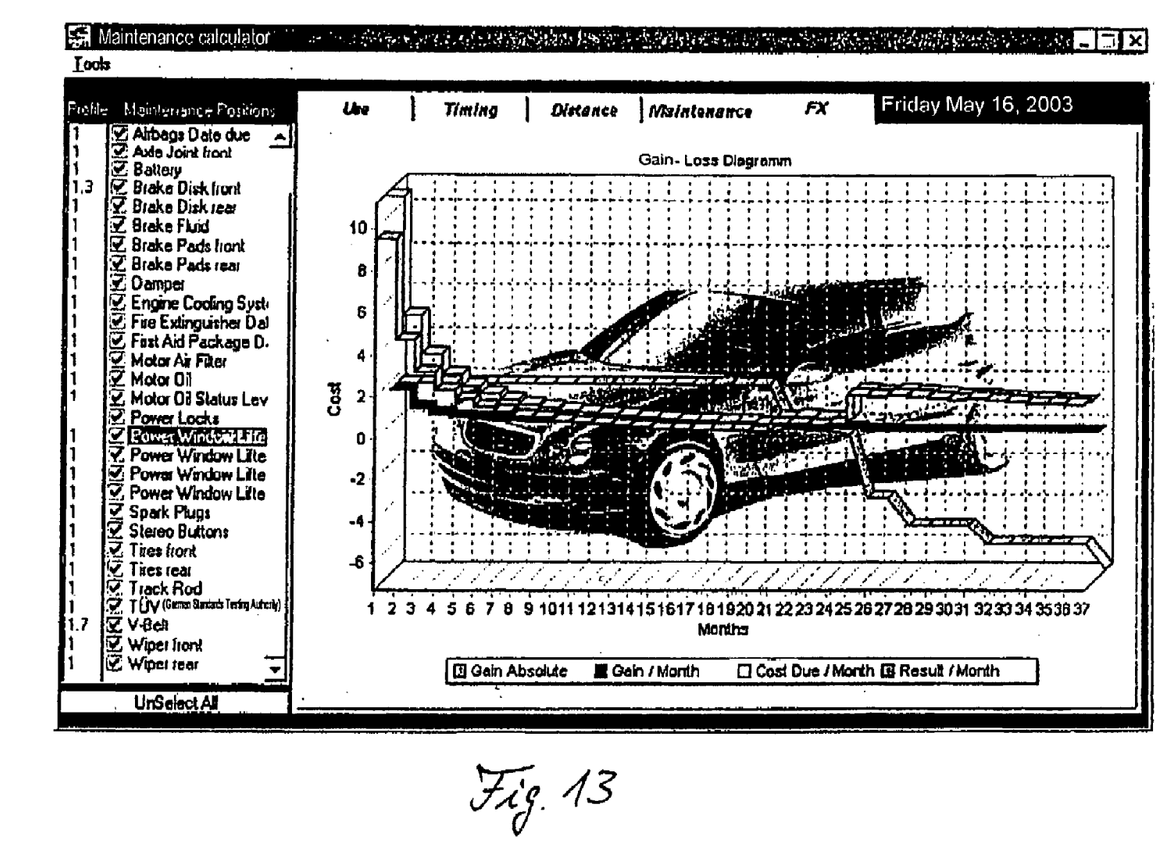
FIGS. 13 and 14 show graphic displays of the optimization result by iteration over minimum maintenance intervals.
Figure 14:
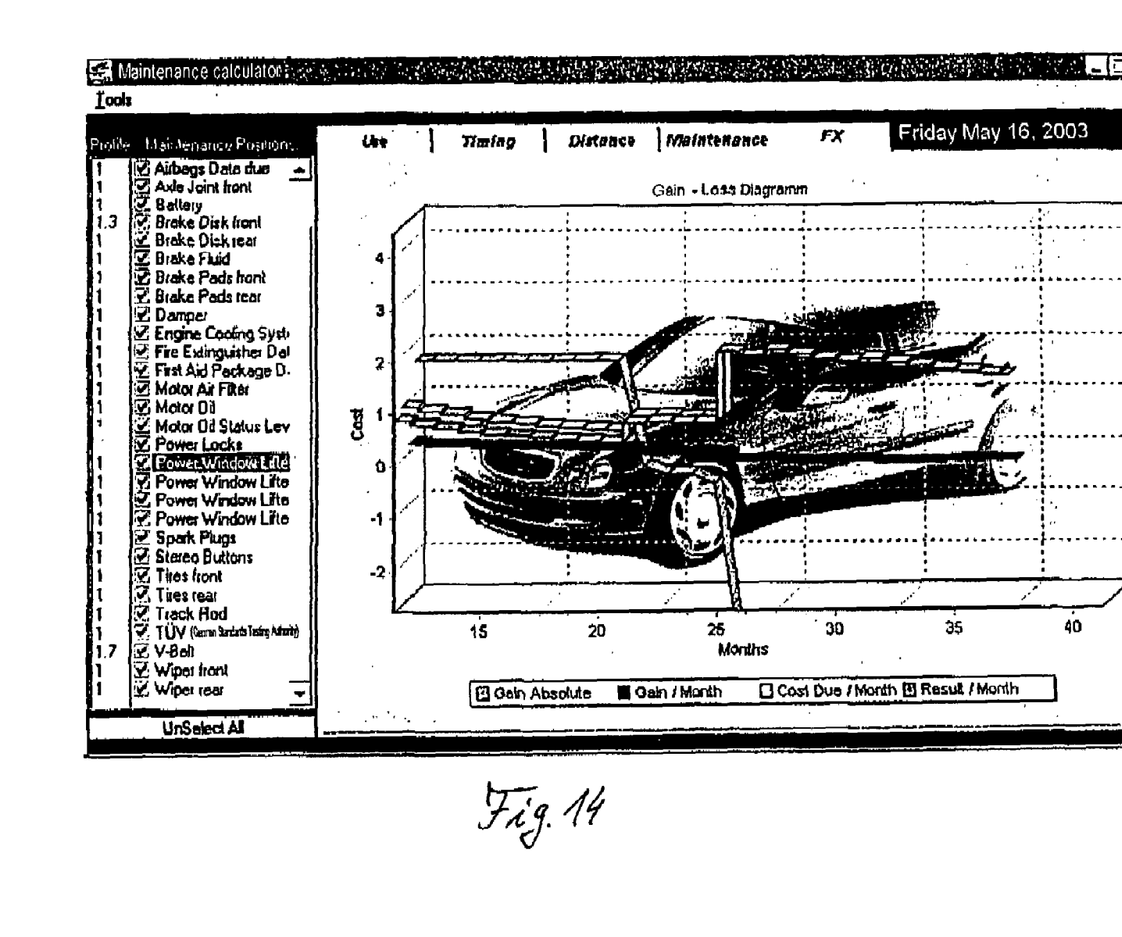

FIGS. 13 and 14 show screen representations of the results of the optimization which is acquired by means of iteration, plotted over the months, the timescales of the two representations differing. These representations are helpful as a decision aid for setting a suitable minimum maintenance interval. When the minimum maintenance interval is lengthened, it may be that certain maintenance items no longer reach the subsequent maintenance time. They are consequently advanced in time, and the losses associated with them lead to a jump in the cost curve of the optimum solution. Less than optimum maintenance intervals are thus to be considered as local minimums of the cost curve and preferably occur before the aforementioned sudden steps in the cost curve. The optimum maintenance interval is the absolute minimum of the cost curve.

Applied to a vehicle, the method according to the invention can be configured in a flexible manner, from small solutions with a small number of maintenance items and simple models, such as linear wear and wear which is influenced by the driver profile, up to large solutions with forty or more maintenance items and correspondingly large models with load collectives and integrated sensor systems. It is also possible, to always have implemented all the maintenance items, and only to enable the respective relevant ones by putting ticks in the screen representations according to FIGS. 9 to 14 for the lists. For a specific vehicle, it is possible to transfer input maintenance items to other vehicles of the same type without difficulty. The editors of the graphic operator control interfaces can also easily be used to create variants for similar types of vehicle. A simplified display interface which is very clearly organized and thus convenient is made available to the system user in the vehicle and is used to display the determined optimum maintenance times and the extent of the respective maintenance operation for its selection.

An approach is preferably selected in which overall standing costs are taken into account over the maintenance period after summing once per maintenance period and also per failure time unit. Money is wasted by advancing an item within the course of optimization and this is taken into account in the optimization algorithm. The costs of a maintenance package are calculated from the costs of the individual maintenance items, it being taken into account that the combination of maintenance items by eliminating multiple working steps can result in cost savings which partially compensate for the moving forward of an item. It then follows from this that the sum of the cost saving through combination of maintenance items per time unit (negative value), on the one hand, and overall standing costs per time unit plus wasted money through moving forward maintenance items per time unit, on the other, is the variable which determines the optimum with respect to the peripheral condition of a predefined minimum interval between two maintenance deadlines. If iteration is performed over the predefined minimum interval between two maintenance deadlines (for example in monthly intervals), a map of the costs per time unit is obtained, plotted against the minimum interval whose minimum constitutes in each case the time and extent of the maintenance deadline, subsequent maintenance deadline, extent of maintenance and subsequent extent of maintenance which are optimum in terms of costs. Here, the variable: sum of "costs per maintenance item/ time" which is constant at the current time can also be added to the cost function.

The above description of an advantageous exemplary embodiment makes it clear that the method according to the invention is advantageously suitable for monitoring individual system components which are subject to wear, and defining (for a system to be maintained), the optimum maintenance times and the extent of respective maintenance operations, in advance using an optimization process. The system user can select a more cost-oriented or more time-oriented optimization using less than optimum solutions by manual correction. The maintenance costs can be calculated on an individual basis. By means of the framework algorithm, it is possible to include the system components individually in this definition of the maintenance operations, and thus inter alia wear models, which are made available by component suppliers, can also be taken into account. Special maintenance operations, due for example to legal requirements, can be taken into account.

Gains in terms of costs through combining maintenance items are calculated in the optimization process together with the cost of advancing maintenance items in order to form maintenance packages, the cost of down time. The method according to the invention is, of course, suitable not only for the maintenance of vehicles but also for the maintenance of any system which requires regular maintenance with a plurality of maintenance items.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for determining timing and scope of maintenance operations for a system having a plurality of maintenance items, said method comprising:
    predefining associated maintenance intervals and tolerance ranges for implementing the maintenance items;
    predefining a minimum maintenance interval between an imminent maintenance operation and a subsequent maintenance operation;
    establishing a predicted time for a next subsequent maintenance operation, at the latest, at the time of a tolerance range end point which occurs first after expiration of the predefined minimum maintenance interval following the time of a preceding maintenance operation; and
    designating as maintenance items to be carried out during the imminent maintenance operation at least those maintenance items whose tolerance range end points occur before the predicted subsequent maintenance time.

2. The method as claimed in claim 1, wherein:
each maintenance item is composed of at least one maintenance secondary item; and
when a maintenance sequence for a respective maintenance operation is created, maintenance secondary items for the maintenance items to be carried out are tested with respect to the possibility of combining them.

3. The method as claimed in claim 1, wherein in designating maintenance items to be carried out during an imminent maintenance operation, an optimization algorithm is implemented which includes advancing maintenance items from subsequent maintenance operations to earlier maintenance operations on a test basis, based on a secondary condition that the predefined minimum maintenance interval is complied with, and that an amount of the maintenance costs according to a cost function is optimized.

* * * * *